United States Patent [19]

Yamaoka et al.

[11] 4,119,542
[45] Oct. 10, 1978

[54] CENTRIFUGAL SEPARATOR

[75] Inventors: Mikio Yamaoka; Yukio Hayashida; Takashi Korekawa; Toshiharu Nibu, all of Kadoma, Japan

[73] Assignee: Matsushita Electric Industrial Company, Limited, Japan

[21] Appl. No.: 858,441

[22] Filed: Dec. 7, 1977

Related U.S. Application Data

[63] Continuation of Ser. No. 623,048, Oct. 16, 1975, abandoned.

[30] Foreign Application Priority Data

Oct. 18, 1974 [JP] Japan .................. 49-120870
Apr. 11, 1975 [JP] Japan .................. 50-44601
Apr. 11, 1975 [JP] Japan .................. 50-49698

[51] Int. Cl.² .............................. B01D 33/06
[52] U.S. Cl. .................. 210/360 A; 99/512; 210/361; 210/374; 210/378; 210/380 R
[58] Field of Search ............ 210/78, 360 R, 360 A, 210/361, 362, 367, 372, 380, 382, 380 R, 399, 478, 480, 350, 351, 378, 500 M, 374; 99/511, 512, 567, 568, 584

Primary Examiner—Frank Sever
Attorney, Agent, or Firm—Robert E. Burns; Emmanuel J. Lobato; Bruce L. Adams

[57] ABSTRACT

A centrifugal separator comprises a follow rotor which is formed with a row of pores arranged circumferentially of the rotor and perforated, cylindrical film detachably received on the inner peripheral surface of the rotor. A mass of a semifluid material positioned within the film is splashed on to the inner surface of the film by a centrifugal force so that the liquid content of the material is passed through the film. The film is radially contracted by the liquid pressure developed between the film and the inner peripheral surface of the rotor and forms a cylindrical interstice between the film and the rotor, providing an additional filter medium through which the liquid is filtered and withdrawn from the pores. The rotor may be closed throughout its area and have a free longitudinal end from which to allow the liquid to withdraw. The centrifugal separator finds an application as a juice extractor if provided with a grating disc.

36 Claims, 21 Drawing Figures

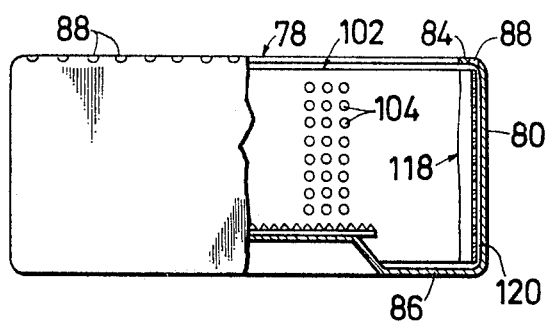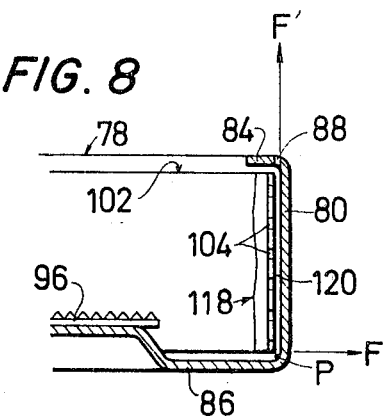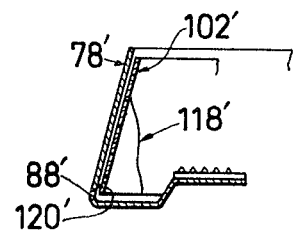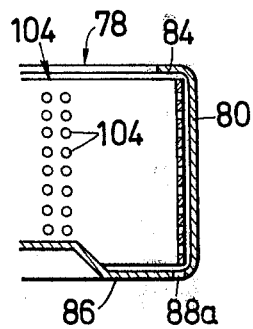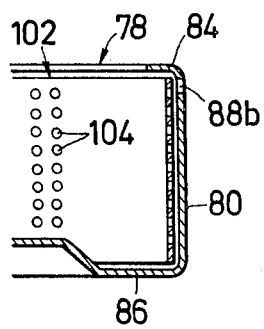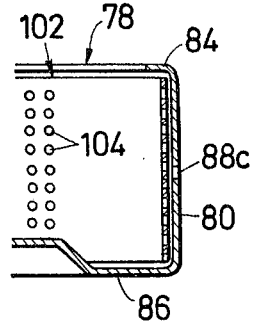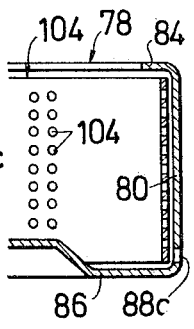

CENTRIFUGAL SEPARATOR

This is a continuation, of application Ser. No. 623,048, filed 10-16-75 now abandoned.

The present invention relates to a method of separating solid and semisolid substances from a semifluid pulp and to a centrifugal separator adapted to carry out such a method. The present invention is further concerned with a juice extractor of the type which separates liquid from a grated fruit or vegetable pulp by means of a centrifugal force imparted to the pulp.

A conventional juice extractor has a perforated centrifuge basket or rotor formed with a number of pores and rotatable about a vertical axis together with a grating disc secured to the basket and formed with teeth on its upper face. The centrifuge basket and the grating disc are driven for rotation by a motor usually positioned below the basket and the materials, such as pieces of succulent fruit or vegetable are fed on to the toothed upper face of the rotating grating disc and are grated into a semifluid pulp consisting of a liquid content and solid and semisolid, granular and fibrous substances. The semifluid pulp is tangentially thrown away from the grating disc by the centrifugal force imparted to the pulp and is caused to impinge upon the inner peripheral surface of the centrifuge basket rotating with the grating disc. A major portion of the liquid content in the pulp is thus passed through the pores in the centrifuge basket and a majority of the solid and semisolid contents remain as refuse within the centrifuge basket. The pores in the centrifuge basket are usually sized to have the diameters of approximately 3 millimeters and, thus, considerable quantities of fine, solid and semisolid granules and fibers are allowed to pass through the pores together with the liquid separated from the pulp. The granules and fibers produce lees and dregs in the juice discharged from the extractor and seriously spoil the quality of the juice to be served.

The quantities of the lees and dregs in the juice may be reduced if the diameters of the pores in the centrifuge basket are reduced. As will be readily understood, however, the pores with reduced diameters tend to be plugged with the solid and semisolid substances during use of the extractor and, for the fabrication of centrifuge baskets formed with such pores, sophisticated machining techniques are necessitated to give rise to an increase in the production cost of the extractors.

It has therefore been proposed and put into practice to have a cylindrical filter element positioned within the centrifuge basket so as to separate the majorities of the solid and semisolid substances in the semifluid pulp from the liquid to be passed through the centrifuge basket. The filter element is detachably received on the inner peripheral surface of the centrifuge basket and is formed with a multiplicity of pores or meshes usually measuring 1.0 millimeter in diameter. Problems have, however, been encountered in the juice extractor of this character as follows:

(a) The pores in the filter element are extremely small in diameter and tend to be plugged with minute, solid and semisolid granules and fibers contained in the grated pulp, causing deterioration of the juice extraction efficiency. If the pores are enlarged to raise the extraction efficiency, then increased quantities of solid and semisolid substances will be allowed to pass through the pores and will produce increased quantities of lees and dregs in the juice to be served.

(b) Many of the pores in the filter element overlap the pores in the centrifuge basket in radial directions of the basket and thus form a number of aligned passageways which are open at the inner peripheral surface of the filter element and the outer peripheral surface of the centrifuge basket. The solid and semisolid granules and fibers contained in the semifluid pulp forced against the inner peripheral surface of the filter element are therefore allowed to penetrate the filter element and project outwardly of the element through the pores forming such passageways. The pores in the filter element being extremely small in diameter, the substances are firmly captured in the pores and it is difficult to remove the substances from the filter element by simply rinsing out the filter element in water.

(c) Some quantities of fine, solid and semisolid substances contained in the grated pulp are allowed to pass through both the pores in the filter element and the pores in the centrifuge basket and are in part deposited on the inner surface of a casing enclosing the basket. The casing is therefore seriously contaminated and must be washed throughout its inner surface after use of the extractor.

(d) The solid and semisolid granules and fibers firmly sticking to the filter element are unable to be dislodged from the filter element during operation of the extractor and, if such substances are distributed irregularly or localized in a limited part of the filter element, the centrifuge basket is subjected to a localized load and is thus disabled from rotating stably, producing serious vibrations and noises.

(e) The total void area (viz., the aggregated open areas of the pores) of the filter element is approximately equal to that of the centrifuge basket as will be discussed in more detail. For this reason, the liquid content in the semifluid pulp which has reached the filter element is so rapidly passed through the filter element and the centrifuge basket that the mass of the refuse accumulated on the inner peripheral surface of the filter element tends to break loose and fall down from the surface, producing a source of vibrations which are intensified as the amount of refuse increases in the centrifuge basket.

The present invention contemplates elimination of all these drawbacks that have been inherent in the prior art juice extractor or, in a broader category, centrifugal separator.

It is, therefore, a first important object of the present invention to provide a method of separating substantially pulp-free liquid from a semifluid pulp of, for example, succulent fruit or vegetable.

It is another important object of the present invention to provide a centrifugal separator adapted to put the method into practice at a low cost.

It is still another important object of the present invention to provide an improved juice extractor capable of producing substantially pulp-free fruit or vegetable juice.

It is still another important object of the present invention to provide an improved juice extractor which can be easily and completely cleaned after use.

It is stll another important object of the present invention to provide an improved juice extractor providing an increased juice extraction efficiency.

It is still another important object of the present invention to provide an improved juice extractor which operates stably irrespective of the amount of material fed thereto and which is thus adapted to reduce vibrations and noises produced during operation of the extractor.

It is still another important object of the present invention to provide an improved juice extractor providing an increased juice extraction percentage or yield.

Yet, it is another important object of the present invention to provide an improved juice extractor which is easy and economical to manufacture and to use.

In accordance with one aspect of the present invention, there is provided a method of separating liquid from a semifluid material, comprising imparting a centrifugal force to the mass of the semifluid material from a fixed axis of rotation, causing the mass of the semifluid material to impinge upon the inner peripheral surface of a radially contractable, perforated cylindrical film rotating about the axis for passing the liquid content of the semifluid material radially outwardly through the film, restricting the radially outward movement of the liquid by a cylindrical wall surface concentrically surrounding the film and rotating with the film about the aforesaid axis of rotation for thereby developing a liquid pressure between the film and the wall surface, the liquid pressure urging the film to radially contract to form a narrow cylindrical interstice between the outer peripheral surface of the film and the wall surface for allowing the liquid between the film and the wall surface to move in the interstice in a direction substantially parallel with the aforesaid axis under the influence of the liquid pressure, and allowing the liquid to radially outwardly withdraw from the interstice under the influence of the centrifugal force imparted to the liquid.

In accordance with another aspect of the present invention, there is provided a centrifugal separator which comprises a follow rotor having a cylindrical wall portion with a center axis and rotatable about the axis and a perforated, cylindrical film detachably received on the inner peripheral surface of the cylindrical wall portion, wherein the cylindrical wall portion of the rotor is closed over at least the majority of its total area and the film is radially contractable. The rotor may be formed with a row of pores spaced apart from each other circumferentially of the rotor or may be closed throughout its area and have a free longitudinal end from which to allow liquid to withdraw from the rotor.

In accordance with still another aspect of the present invention, there is provided a juice extractor which comprises a centrifuge basket having a cylindrical wall portion with a center axis and rotatable about the axis, a perforated, cylindrical filter element detachably received on the inner peripheral surface of the cylindrical wall of the basket, and a grating disc positioned internally of the filter element and rotatable with the centrifuge basket, wherein the centrifuge basket is closed over at least the majority of its total area and the filter element is radially contractable. The centrifuge basket may be formed with a row of pores spaced apart from each other circumferentially of the basket or may be closed throughout its total area and have one free longitudinal end from which to allow liquid radially outwardly of the cylindrical wall portion of the basket.

The features and advantages of the method, the centrifugal separator and the juice extractor according to the present invention will become more apparent from the following description taken in conjunction with the accompanying drawings in which:

FIGS. 3 to 5 are photographs illustrating the afteruse condition of the juice extractor basically constructed as illustrated in FIG. 1, wherein FIG. 3 is a front elevational view of the juice extractor, FIG. 4 is a side view of the filter element incorporated in the juice extractor and FIG. 5 is a plan view of the filter element;

FIG. 7 is a half sectional and half side elevational view of important component parts of the juice extractor illustrated in FIG. 6;

FIG. 8 is a fragmentary sectional view of such component parts, the view being for analysis into the behaviour of the liquid being withdrawn from the extractor;

FIG. 9 is a fragmentary sectional view showing an imaginary arrangement of part of a juice extractor which may be modified, though not preferable, from the juice extractor embodying the present invention;

FIGS. 10 to 12 are photographs which illustrate the after-use condition of the juice extractor basically constructed as shown in FIG. 6, wherein FIG. 10 is a front elevational view of the extractor, FIG. 11 is a side view of the filter element incorporated into the juice extractor and FIG. 12 is a plan view of the filter element;

FIGS. 13a to 13d are fragmentary sectional views showing important portions of modifications of the embodiment illustrated in FIG. 6;

The term "juice extraction percentage" above-mentioned is herein defined as $$\frac{\text{Weight of the juice obtained}}{\text{Weight of the material fed}} \times 100.$$

Before entering into detailed description of the present invention, it may be noted that, while the present invention will be described as being embodied in a juice extractor, such is merely for the purpose of illustration and, thus, the features of the juice extractor to be hereinafter described may be incorporated, substantially without change, into a centrifugal separator of the general construction previously described.

Figure 1:
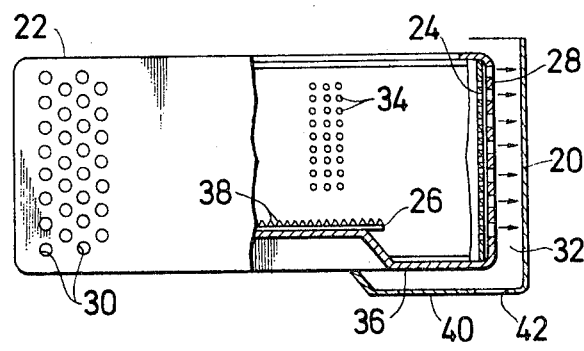
FIG. 1 is a half sectional and half side elevational view showing a representative example of a prior art juice extractor.

Referring to FIG. 1 of the drawings, a conventional juice extractor is shown largely comprising a generally cylindrical casing 20, a centrifuge basket 22, a filter element 24 and a grating disc 26. The centrifuge basket 22 is concentrically positioned within the casing 20 and has a cylindrical perforated wall 28 formed with a number of pores 30 which are uniformly distributed throughout the area of the wall 28. The perforated wall 28 of the centrifuge basket 22 is slightly radially spaced apart from the inner peripheral surface of the casing 20, forming a cylindrical gap 32 between the inner peripheral surface of the casing 20 and the outer peripheral surface of the perforated wall 28 of the basket 22. The filter element 22 consists of a thin plastic film formed with a multiplicity of pores 34 uniformly distributed throughout the area of the film and is detachably received on the inner peripheral surface of the cylindrical perforated wall 28 of the centrifuge basket 22. The pores 34 in the filter element 24 are sized smaller and distributed more densely than the pores 30 in the centrifuge basket 22. Usually, the pores 30 in the basket 22 measure approximately 3.0 millimeters in diameter and are provided 756 in number (thus providing a total void area of approximately 5341 square millimeters) whilst the pores 34 in the filter element 24 measure approximately 1.0 millimeter in diameter and are provided 7320 in number (providing a total void area of approximately 5746 square millimeters. The centrifuge basket 22 has a closed bottom wall 36 having a raised central portion on which the grating disc 26 is fixedly mounted. The grating disc 26 is formed with a plurality of teeth 38 on its upper face. The centrifuge basket 22 is rotatable about its vertical center axis and is driven for rotation about the axis by means of a motor (not shown) which is positioned below the casing 20. The casing 20 has an annular bottom wall 40 which is formed with a liquid discharge opening 42.

When the juice extractor thus constructed is in use, pieces of succulent fruit or vegetable such as for example slices of apples or carrot stalks are fed through a suitable passageway (not shown) into the centrifuge basket 22 which is being rotated by the motor. The pieces of fruit or vegetable are forced against the toothed upper face of the grating disc 26 being rotated with the centrifuge basket 22, grated by the teeth 38 of the grating disc 26 and are reduced to a semifluid pulp 44 consisting of a liquid content and solid and semisolid granules and fibers which are composed of the fine fragments of the disintegrated fruit or vegetable tissues. The semifluid pulp 44 is tangentially thrown away from the grating disc 26 under the influence of the centrifugal force resulting from the rotation of the disc 26 and is splashed on to the inner peripheral surface of the cylindrical filter element 24 which is also being rotated with the centrifuge casing 22. The liquid content of the semifluid pulp 44 is the passed through the pores 34 in the filter element 24 and thereafter through pores 30 in the centrifuge basket 22 into the cylindrical gap 32 between the basket 22 and the cylindrical casing 20 as indicated by arrows and is allowed out of the casing 20 through the liquid discharge opening 42 in the annular bottom wall 40 of the casing 20. A major portion of the liquid content of the initial semifluid pulp 44 is thus separated from the solid and semisolid granules and fibers, which consequently remain as refuse within the centrifuge basket 22 or, more exactly, inside the cylindrical filter element 24.

Figure 2:
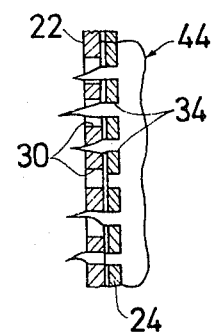
FIG. 2 is a sectional view showing, to an enlarged scale, portions of the centrifuge basket and the filter element forming part of the juice extractor illustrated in FIG. 1.

As is well known, however, considerable quantities of solid and semisolid contents of the semifluid pulp 44 are actually allowed to pass through the pores 34 in the filter element 24 and the pores 30 in the centrifuge basket 22 as illustrated in FIG. 2 and are in part deposited on the inner peripheral surface of the casing 20 and in part allowed out of the casing 20 together with the extracted juice discharged through the liquid discharge opening 42 in the casing 20. The solid and semisolid granules and fibers sticking to the casing 20 produce stains on the inner surface of the casing and, thus, the user of the juice extractor is compelled to wash the casing 20 each time he or she uses the extractor if the user chooses to keep the extractor clean and hygienic. On the other hand, the granules or fibers allowed out of the casing 20 produce dregs and scum in the juice as will be seen from FIG. 3 in which the juice is shown collected in a measuring cylinder 46, critically spoiling the quality of the juice to be served.

Because, moreover, of the fact that many of the pores 34 in the filter element 24 are in overlapping relationship to the pores 30 in the centrifuge basket 22, there are produced a number of aligned passageways across the filter element 24 and the centrifuge basket 22 as will be seen from FIG. 2. The solid and semisolid granules and fibers in the semifluid pulp 44 impinging upon the inner peripheral surface of the filter element 24 are therefore forcibly caused to pierce the filter element 24 through the pores 34 forming such passageways under the influence of the centrifugal force imparted thereto, as will be seen from FIGS. 4 and 5. The pores 34 being extremely small sized, the granules and fibers thus penetrating through the filter element 24 are closely captured in the pores 34 and plug many of the pores 34 in the filter element 24. This not only causes critical deterioration of the juice extraction efficiency but will create unusual vibrations and noises if the granules and fibers sticking to the filter element 24 are distributed irregularly or localized on a limited part of the filter element 24. The plugging of the pores 34 in the filter element 24 may be avoided if the pores 34 are enlarged in diameter. If, however, the pores 34 in the filter element 24 are enlarged, then increased quantities of lees and dregs will be contained in the juice extracted and will thus further spoil the quality of the juice to be served, although the juice extraction efficiency may be augmented. No useful expedient has been proposed and put into practice to provide a practical compromise between these mutually conflicting requirements. One of the important goals of the present invention is to provide a solution to all these problems that have been encountered in a prior art juice extractor of the type illustrated in FIG. 1.

Figure 6:
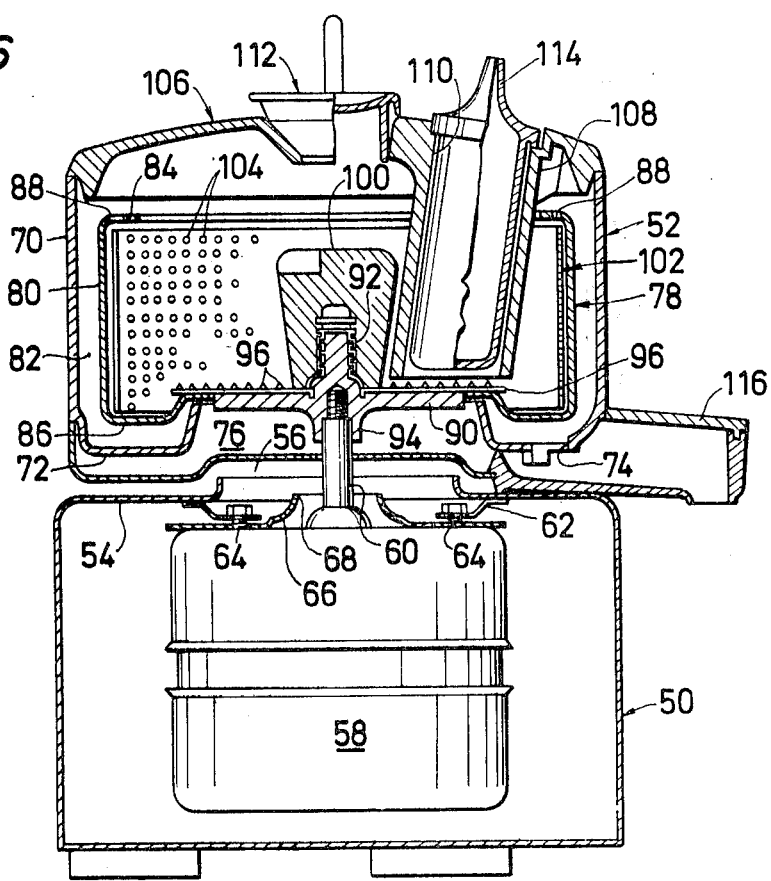
FIG. 6 is a vertical sectional view which shows a preferred embodiment of the juice extractor according to the present invention.

Referring to FIG. 6, a juice extractor embodying the present invention comprises lower and upper stationary casings 50 and 52. The lower stationary casing 50 has an upper wall portion 54 formed with an opening 56 and has fixedly accommodated therewithin a motor 58 having a vertical output shaft 60 which projects upwardly out of the casing 50 through the opening 56. The motor 58 is shown suspended from the upper wall portion 54 of the casing 50 by an annular bracket 62 and bolts 64 for the purpose of minimizing the vibrations transferred from the motor 58 to the casing 50. Designated by reference numeral 66 is a dust cover which is fixed to the motor 58 by the bolts 64 to prevent an ingress of dust into the motor. The dust cover 66 is formed with an opening 68 through which the output shaft 60 of the motor 58 extends upwardly.

The upper stationary casing 52 is positioned above the lower stationary casing 50 and consists of a cylindrical wall portion 70 having an open upper end and a channel-shaped, annular bottom wall portion 72 formed with a liquid discharge opening 74. The annular bottom wall portion 72 encircles an opening 76 which is located above the opening 56 in the upper wall portion 54 of the lower stationary casing 50. The upper stationary casing 52 has concentrically accommodated therewithin a rotor or centrifuge basket 78 having a vertical center axis which is aligned with the axis of rotation of the output shaft 60 of the motor 58. The centrifuge basket 78 consists of a cylindrical wall portion 80 radially inwardly spaced apart from the inner peripheral surface of the cylindrical portion 70 of the casing 52 so as to form a generally cylindrical gap 82 between the wall portions 70 and 80, an inner flange portion 84 projecting radially inwardly from the upper end of the cylindrical wall portion 80 and an annular bottom wall portion 86 upwardly spaced apart from the annular bottom wall portion 72 of the casing 52, as shown. The inner flange portion 84 of the centrifuge basket 80 is formed with a number of pores 88 which are spaced apart, preferably equidistantly, from each other circumferentially of the flange portion 84. For the reason tht will become apparent as the description proceeds, it is preferable that each of the pores 88 be located to be contiguous to the inner peripheral surface of the cylindrical wall portion 80 at its end remotest from the inner circumferential edge as illustrated. Each of the pores 88 may be shaped and sized as desired but, in view of the results of the experiments thus far conducted, it is preferable that the pores 88 be circular and have the diameters of approximately 2 millimeters for ordinary use of the juice extractor. For the reason that will be explained later, furthermore, it is preferable that the pores 88 having such diameters be provded about forty in number for an ordinarily sized juice extractor.

The annular bottom wall portion 86 of the centrifuge basket 78 thus configured is fixedly connected at its entire inner circumference to a circular rotor disc 90 having a vertical center axis wich is aligned with the axis of rotation of the output shaft 60 of the motor 58. The rotor disc 90 is centrally formed with an externally toothed projection 92 projecting upwardly from the upper face of the disc 90 and a boss 94 projecting downwardly from the lower face of the disc 90. The output shaft 60 of the motor 58 is fixedly connected at its upper end portion to the boss 94 of the rotor disc 90 and supports the centrifuge basket 78 through the rotor disc 90. The centrifuge basket 78 is thus rotatable with the output shaft 60 of the motor 58 about its vertical center axis which is aligned with the axis of rotation of the shaft 60. The rotor disc 90 has supported on its upper face a circular grating disc 96 having a central aperture closely receiving the lowermost portion of the upper projection 92 of the rotor disc 90. The grating disc 96 has a roughened upper face formed with a number of minute knife-edged projections or teeth 98 which are distributed, at suitable spacings from each other, throughout the entire area of the upper face of the disc 96. The grating disc 96 is releasably secured to the rotor disc 90 by means of an internally toothed clamp 100 engaging the externally toothed upper projection 92 of the rotor disc 90.

A cylindrical filter element 102 is detachably received on the inner peripheral surface of the cylindrical wall portion 80 of the centrifuge basket 78. The filter element 102 is formed with a multiplicity of small pores 104 which are uniformly distributed throughout the area of the filter element 102. Each of the pores 104 is preferably sized to be approximately one half of th size of each of the pores 88 in the centrifuge basket 78, measuring about 1.0 millimeter in diameter where the pores 88 have the diameters approximating 2.0 millimeters as previously mentioned. The filter element 102 is in its entirety radially contractable away from the inner peripheral surface of the cylindrical wall portion 80 of the centrifuge basket 78 and, for this purpose, it is preferable that the filter element 78 be formed of an elongate, thin perforated film of a flexible material having free longitudinal ends which may overlap each other when the film is positioned in a cylindrical configuration within the centrifuge basket 78. The meshes per unit area of the pores 104 in the filter element 102 may be selected arbitrarily but, in the embodiment shown in FIG. 3, it is assumed that the pores 108 and provided 7320 in number over the total area of the filter element 102 for the reason which wiil be clarified later. For the reason which will also be explained later, it may be noted that the "cylindrical" wall portion 80 of the centrifuge basket 78 and the "cylindrical" filter element 102 have respective diameters which are uniform throughout their respective lengths or heights, although the diameter of the filter element 102 will be slightly reduced when the filter element 102 is radially contracted.

The juice extractor shown in FIG. 6 further comprises a lid 106 which has an outer circumferential end portion conformingly to the upper free end of the cylindrical wall portion 70 of the upper stationary casing 52 and which is thus snugly but detachably received on the casing 52 when it is desired to close the casing above the open upper end thereof. The lid 106 has a tubular projection 108 directed downwardly in the centrifuge basket 78 and terminating above the upper face of the grating disc 96 when the lid 106 is attached to the casing 52 as shown. The tubular projection 108 is formed with a passageway 110 through which to guide pieces of material to be fed on to the grating disc 96 during use of the extractor. The lid 106 can be clamped to the casing 52 by means of a clamp mechanism 112 the details of which are well known in the art. Designated by reference numeral 114 is a feeding plunger which may be used to forcibly feed pieces of material through the passageway 110. A spout 116 is securely or detachably connected to the bottom wall portion 76 of the casing 52 for providing a passageway leading from the discharge opening 74 in the bottom wall portion 76 and terminating sidewise of the lower stationary casing 50 as shown.

When, now, the motor 58 is started, the centrifuge basket 78, rotor disc 90, grating disc 96 and filter element 102 are bodily driven for rotation about the vertical center axis of the centrifuge basket 78 by the output shaft 60 of the motor 58. The filter element 102 is caused to radially expand and urged against the inner peripheral surface of the cylindrical wall portion 80 of the centrifuge basket 78 under the influence of the centrifugal force produced therein. Pieces of succulent fruit or vegetable (not shown) are then fed through the passageway 110 in the tubular projection 108 of the lid 106 clamped to the upper stationary casing 52 and are forced against the upper face of the grating disc 96 by the aid of the feeding plunger 114 if necessary. The material is grated by the knife-edged projections or teeth 98 of the grating disc 96 and is reduced to a semi-fluid pulp 118 (FIG. 7) consisting of a liquid content and solid and semisolid granular and fibrous contents. The semifluid pulp is thrown tangentially away from the grating disc 96 and is caused to impinge upon the inner peripheral surface of the cylindrical filter element 102 under the influence of the centrifugal force imparted to the pulp by the grating disc 96. The semifluid pulp 118 thus reaching the filter element 102 is forced urging against the inner peripheral surface of the filter element 102 under the influence of the centrifugal force resulting from the rotation of the filter element 102, as indicated in FIG. 7. The liquid contained in the semifuid pulp 118 on the inner peripheral surface of the filter element 102 is passed through the pores 104 in the filter element 102 and the solid and semisolid granules and fibers which have not been passed through the pores 104 are collected inside the filter element 102. The liquid passed through the filter element contains minute quantities of solid and semisolid substances which have passed through the pores 104. Assuming that such a substance is located at point P in FIG. 8, the solid or semisolid substance is subjected to a radially outward force F by the centrifugal force imparted to the substance. In the absence of any pores and recesses in the cylindrical wall portion 80 of the centrifuge basket 78, a pressure is developed between the inner peripheral surface of the horizontal wall portion 80 of the centrifuge basket 78 and the outer peripheral surface of the filter element 102, urging the filter element 102 to radially contract against the centrifugal forces imparted to the filter element and the mass of the refuse on the inner peripheral surface of the element. As a consequence, the filter element 102 is slightly radially spaced apart from the inner peripheral surface of the centrifuge basket 78 and forms an extremely narrow, cylindrical gap or interstice 120 between the inner peripheral surface of the cylindrical wall portion 80 of the centrifuge basket 78 and the outer peripheral surface of the filter element 102 as indicated in FIG. 8. The pressure thus developed in the cylindrical interstice 120 produces a force F' which is directed upwardly from the point P and which is approximately equal in magnitude to the radially outward force F. The upward force F' acts on the minute solid or semisolid substance at the point P and urges the substance upwardly therefrom. The cylindrical interstice 120 is, however, so narrow throughout its area that the substance at the point P is firmly restrained between the filter element 102 and the centrifuge basket 78 and, for this reason, only the liquid content is permitted to move upwardly through the cylindrical interstice 120 toward the perforated inner flange portion 84 of the centrifuge basket 78 by the force F'. The cylindrical interstice 120 formed between the filter element 102 and the centrifuge basket 78 thus provides a secondary filter medium which separates the fine lees and dregs from the liquid which has been passed through the filter element 102 serving as a primary filter medium. The liquid which has reached the pores 88 in the inner flange portion 84 of the centrifuge basket 78 is tangentially splashed away from the flange portion 84 and impinges upon the inner peripheral surface of the cylindrical wall portion 70 of the upper stationary casing 52. The liquid then drops down the inner peripheral surface of the wall portion 70, flows on the upper concave surface of the channel-shaped, annular bottom wall portion 72 of the casing 52, and is discharged from the casing 52 through the liquid discharge opening 74 in the bottom wall portion 72 of the casing. The liquid is then conducted through the spout 116 and is collected in a suitable vessel (not shown) positioned below the outlet of the spout 116.

To enable the liquid to smoothly flow through the cylindrical interstice 120 formed between the filter element 102 and the centrifuge basket 78, it is important that the interstice 120 have a uniform thickness throughout its length or height. If the centrifuge basket and the filter element are generally frusto-conical and are reduced upwardly as indicated by 78' and 102', respectively, in FIG. 9, then the semifluid pulp, designated by 118', will be localized on and in the vicinity of the lower portion of the inner peripheral surface of the filter element 102' as the centrifuge basket 78' and the filter element 102' are rotated. The filter element 102' is consequently subjected to a radially outward force which increases downwardly of the element so that the interstice 120' formed between the centrifuge basket 78' and the filter element 102' by the liquid pressure developed outside the filter element will be accordingly narrowed downwardly. If, thus, pores 88' are formed in a lower portion of the centrifuge basket 78' as shown in FIG. 9, the liquid tending to flow in the interstice 120' toward the pores 88' is subjected to a substantial resistance and is accordingly prevented from smoothly flowing in the interstice 120'. Such a problem is, however, not encountered in the juice extractor embodying the present invention wherein the cylindrical wall portion 80 of the centrifuge basket 78 and the cylindrical filter element 102 have respective diameters which are equal throughout their lengths or heights so that the semifluid pulp 118 splashed upon the filter element 102 is distributed substantially evenly throughout the area of the inner peripheral surface of the filter element 102 as seen in FIG. 7 and thus maintains the cylindrical interstice 120 uniformly thick throughout its height.

As the semifluid pulp 118 impinges upon the inner peripheral surface of the filter element 102 and is urged radially outwardly on the filter element 102 under the influence of the centrifugal force imparted thereto, some quantities of solid and semisolid granules and fibers are allowed to intrude into the pores 104 in the filter element 102. In the absence, however, of pores in that wall portion of the centrifuge basket 78 which is coextensive with the filter element 102 and by reason of the liquid pressure which urges the pulp 118 radially away from the inner peripheral surface of the filter element 102, substantially none of such granules and fibers are permitted to penetrate through the pores 104. The solid and semisolid substances deposited on the filter element 102 can therefore be readily dislodged therefrom by removing the filter element 102 from the centrifuge basket 78 and rising it out in water.

Because, moreover, of the fact that the centrifuge basket 78 has no pores which are aligned with the pores 104 in the filter element 102, there are substantially no solid or semisolid granules and fibers firmly sticking to the centrifuge basket 78 as well as to the filter element 102. The lees and dregs deposited on the inner surface of the centrifuge basket 78 can therefore be easily removed therefrom simply by washing the basket in water. In the absence of lees and dregs in the liquid which has been passed through the pores 104 in the centrifuge basket 78, furthermore, there is substantially no solid or semisolid substances deposited on the inner surface of the casing 52. The casing 52 can therefore be also easily cleaned simply by wiping the inner surface of the casing 52 with a cloth.

Figure 3:
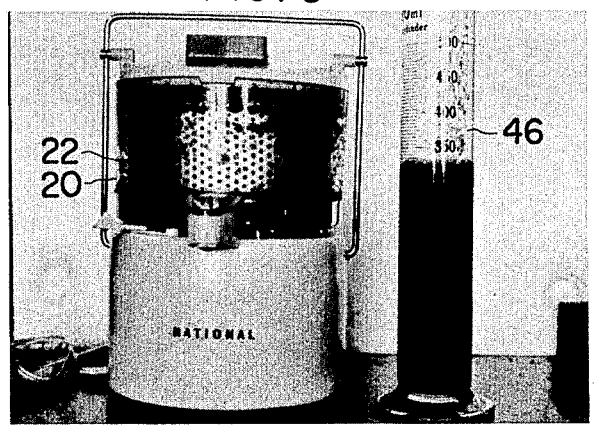
Figure 4:
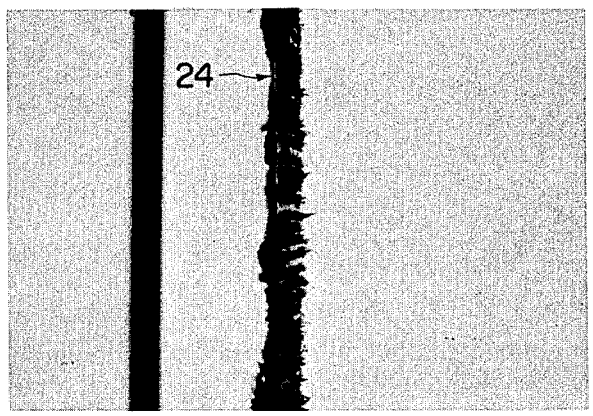
Figure 5:
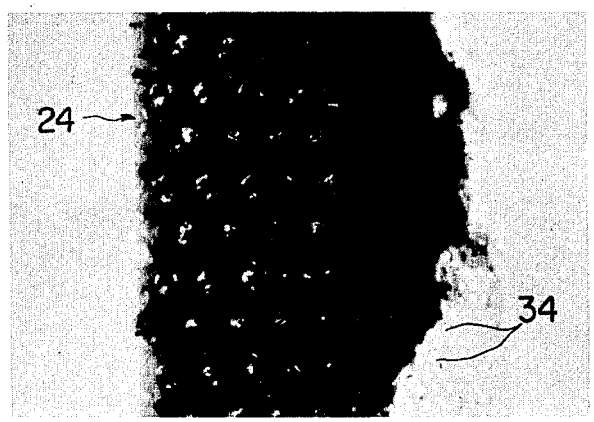
Figure 10:
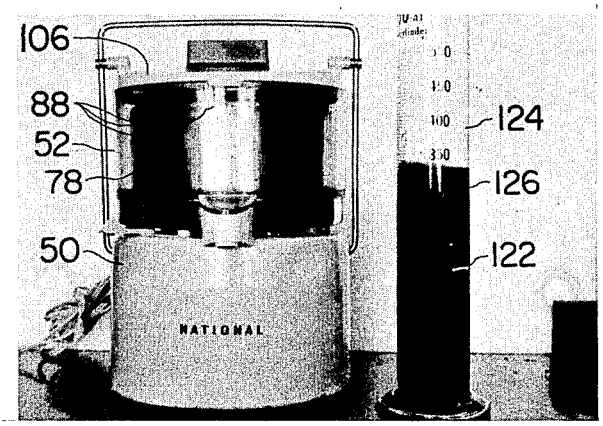
Figure 11:
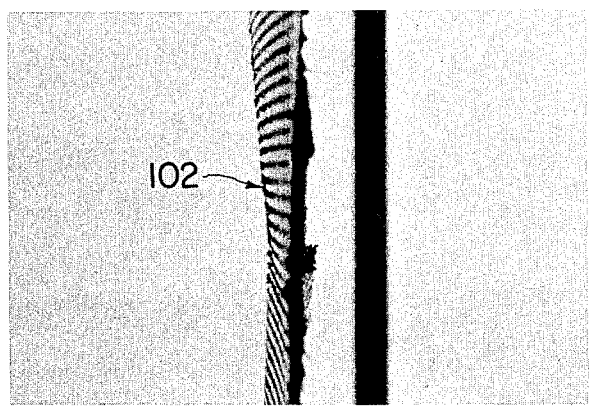
Figure 12:

Experiments were conducted with the juice extractor embodying the present invention so as to compare the after-use conditions of the extractor and the quality of the juice thereby obtained with the after-use conditions of the prior art juice extractor shown in FIGS. 3 to 5 and the juice thereby obtained. In these experiments, the juice was extracted from the same kind of material and under substantially the same conditions as those used in the experiments conducted with the prior art juice extractor. FIGS. 10 to 12 illustrate one of the results of the experiments carried out with the juice extractor embodying the present invention. As will be first seen from the photograph of FIG. 10, the inner peripheral surface of the casing 52 (formed of a transparent material to provide ease of visual inspection) as well as the outer peripheral surface of the centrifuge basket 78 remains substantially clean after the extractor has been used and the resultant juice 122, shown collected in a measuring cylinder 124 is far cleaner than the juice illustrated in FIG. 3 although the juice 122 shown in FIG. 10 is seen to contain a small quantity of scum 124 floating on the surface of the liquid. The scum 124 may be easily scooped up from the liquid by the use of a cooking spoon or the like. From FIGS. 11 and 12, furthermore, it is seen that there is substantially no substances piercing through the pores 104 in the filter element 102 and projecting outwardly from the outer face (on the left side of the filter element shown in FIG. 11) of the filter element 102.

While the pores 88 in the centrifuge basket 78 have been described and shown to be formed in the inner flange portion 84 of the basket, the pores may be formed in the bottom wall portion 86 of the basket as indicated at 88a in FIG. 13a or in the cylindrical wall portion 80 of the basket as indicated at 88b, 88c or 88d in FIG. 13b, 13c or 13d, respectively. Similarly to the pores 88 in the flange portion 84 of the centrifuge basket 78 shown in FIG. 6, it is preferable that each of the pores 88a formed in the bottom wall portion 86 (FIG. 13a) be located to be contiguous to the inner surface of the cylindrical wall portion 80 at its end remotest from the circumferential edge of the bottom wall portion 86. The pores formed in the cylindrical wall portion 80 may be located at the upper end of the wall portion 80 as is the case with the pores 88b shown in FIG. 13b, in a vertically middle part of the wall portion 80 as is the case with the pores 88c shown in FIG. 13c or at the lower end of the wall portion 80 as is the case with the pores 88d shown in FIG. 13d. Though not shown in the drawings, moreover, the pores may be formed both in the flange portion 84 and the bottom wall portion 86 of the centrifuge basket 78, if desired. In this instance, it is preferable that the number of the pores formed in each of the flange and bottom wall portions be approximately equal to one half of the number of the pores formed solely in the flange portion 84 or the bottom wall portion 86 or in the cylindrical wall portion 80 of the centrifuge basket 78 shown in FIG. 13b, 13c or 13d.

Figure 14:
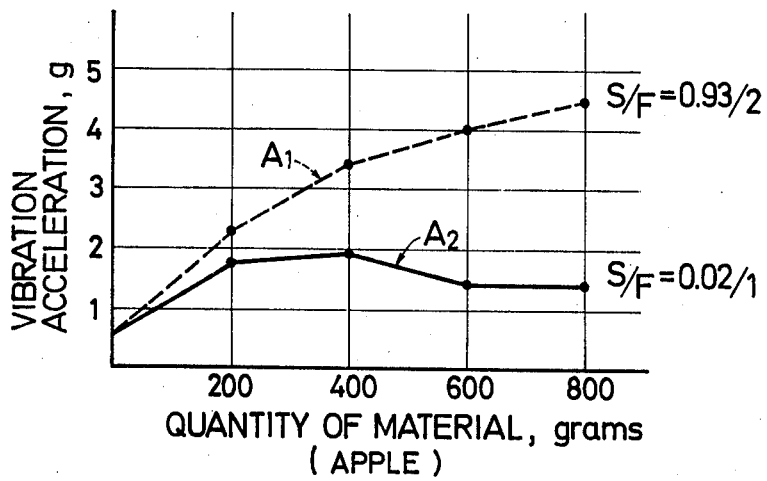
FIG. 14 is a graph showing relationship between the quantity of material fed to a juice extractor and the vibration acceleration consequently produced by the extractor, the material being apple.
Figure 15:
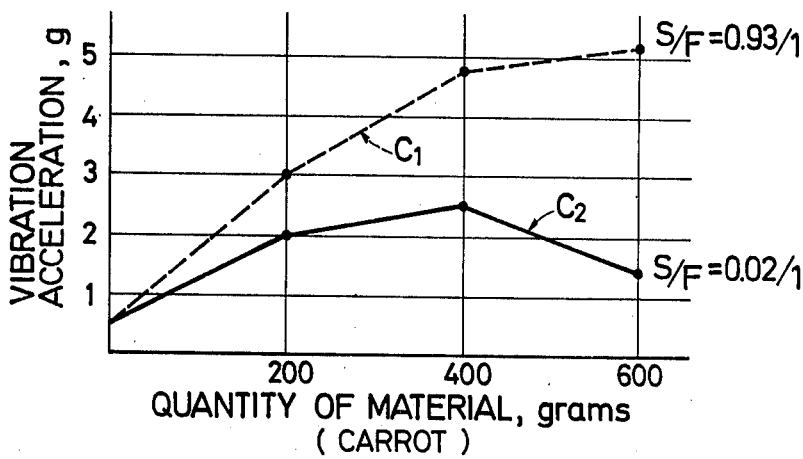
FIG. 15 is a graph similar to the graph of FIG. 14 but shows such relationship observed when using carrot stalks as the material fed to the juice extractor.

As previously noted with reference to FIG. 1, the open areas of the pores in the filter element total up to approximately 5746 mm$^2$ and the open areas of the pores in the centrifuge basket total up to approximately 5341 mm$^2$ in the prior art juice extractor illustrated in FIG. 1. If, in this instance, the total void area of the perforated wall portion of the centrifuge basket is represented by S and the total void area of the filter element represented by F, then the ratio S/F between the total void areas will become approximately 0.93. This means that the aggregate open areas of the pores in the centrifuge basket and the filter element are roughly equal to each other. This, in turn, means that the liquid content in the semifluid pulp reaching the filter element is rapidly passed through the filter element and the centrifuge basket and causes the semifluid pulp to be dehydrated and lose is viscidity in a short while. The mass of the pulp thus dehydrated and accumulated on the inner peripheral surface of the filter element is impinged upon by the fresh semifluid pulp thrown continuously or at a certain interval from the grating disc and is thus caused to break loose and fall down from the filter element. Such a phenomenon gives rise to an increase in the vibrations produced by the juice extractor and, for this reason, the prior art juice extractor has a tendency that the vibrations produced by the extractor are intensified as the quantity of the refuse accumulated within the centrifuge basket increases. FIGS. 14 and 15 graphically show the results of the experiments which were conducted to investigate into the relationship between the quantity in grams of the materials fed to a juice extractor and the vibration acceleration (in terms of the acceleration due to gravity, g) produced by the extractor, the materials used being slices of apples for FIG. 14 and carrot stalks for FIG. 15. In FIGS. 14 and 15, curves $A_1$ and $C_1$ indicate the vibration accelerations produced by the prior art juice extractor of the type illustrated in FIG. 1 and curves $A_2$ and $C_2$ indicate those produced by a juice extractor which is constructed basically as illustrated in FIG. 6 and into which is further incorporated the improvement to be described. As will be evident from the curves $A_1$ and $C_1$, the vibration acceleration produced by the prior art juice extractor increases approximately in proportion to the quantity of the material fed to the juice extractor irrespective of the nature of the materials used. As will be understood from the discussion previously made, this tendency largely results from the relation between the total void areas of the filter element and the perforated wall portion of the centrifuge basket. Experiments were therefore made for the purpose of investigating into the relation between the ratio S/F between the total void areas of the perforated wall portion of a centrifuge basket and a filter element and the vibration acceleration consequently produced by the juice extractor, the results of the experiments being shown in FIG. 16. The ratio S/N between the total void areas of the basket and the filter element is predominant not only over the vibration acceleration of a juice extractor but over the juice extraction percentage (previously defined) available of the extractor. FIG. 17 illustrates the results of experiments which were thus conducted to determine the relation between the ratio S/F and the juice extraction percentage. The data illustrated in FIGS. 16 and 17 were obtained by feeding 600 grams of carrot stalks into the juice extractor in each of the experiments.

Figure 16:
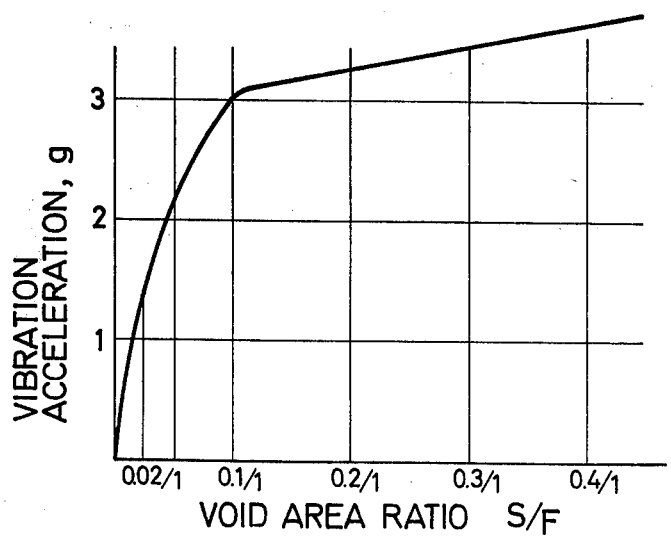
FIG. 16 is a graph showing relationship between the ratio between the total void areas of the centrifuge basket and the filter element of a juice extractor and the vibration acceleration produced by the extractor.
Figure 17:
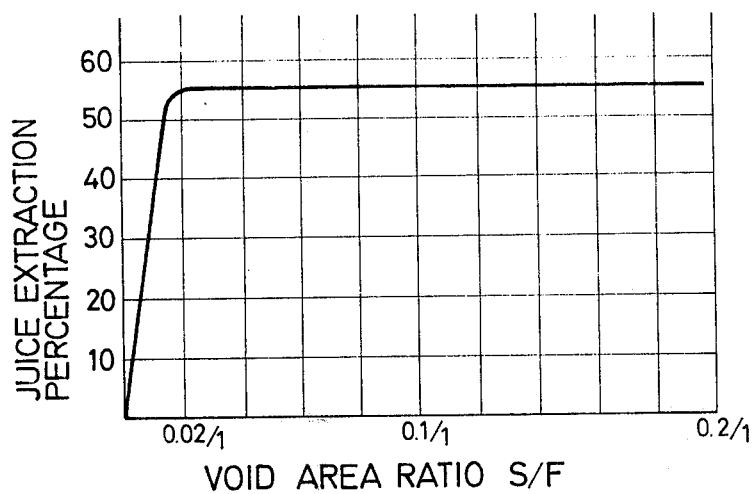
FIG. 17 is a graph showing relationship between such a ratio and the juice extraction percentage.

From the graph of FIG. 16, it is evidently seen that the vibration acceleration of the juice extractor increases steeply as the ratio S/F approaches 0.1:1.0 and moderately as the ratio S/F is increased beyond 0.1:1.0. The vibration acceleration reaches about 5g when the ratio S/F becomes 0.93:1.0 as will be seen from the curve $C_1$ of FIG. 15. It is, for this reason, advisable to have the centrifuge basket and the filter element perforated in such a manner that the ratio S/F is reduced to a smallest possible value. In view, however, of the fact that the juice extraction percentage steeply drops when the S/F ratio is reduced below 0.02:1.0 as will be seen from the graph of FIG. 17, it is preferable that the S/F be made not less than 0.02:1.0. The pores in the centrifuge basket and the filter element of the juice extractor embodying the present invention are, thus, preferably arranged to provide an S/F ratio within the range of from 0.02:1.0 and 0.1:1.0 so as to minimize the vibrations produced by the extractor and to nevertheless achieve an optimum juice extraction percentage. The curves $A_2$ and $C_2$ of FIGS. 14 and 15, respectively, were obtained when the centrifuge basket and the filter element of the juice extractor embodying the present invention were arranged to provide the S/F ratio of 0.02:1.0. From the curves $A_2$ and $C_2$, it will be understood that the vibration acceleration produced by the juice extractor embodying the present invention is far lower than that produced by the prior art juice extractor and is maintained approximately constant irrespective of the quantity of the material fed to the extractor. The reduction of the vibrations is considered to owe not only to the reduction of the S/F ratio but to the essential features of the juice extractor according to the present invention in which (1) the solid and semisolid granules and fibers are not caused to pierce through the filter element and are thus facilitated to slide on the inner peripheral surface of the element, and (2) the granules and fibers on the inner peripheral surface of the filter element are maintained viscid and slidable on the filter element partly because the liquid content of the semifluid pulp is allowed to stay within the filter element for a prolonged period of time and partly because the pulp on the inner peripheral surface of the filter element is constantly held in contact with the liquid on the outer surface of the filter element through the pores in the element.

Figure 18:
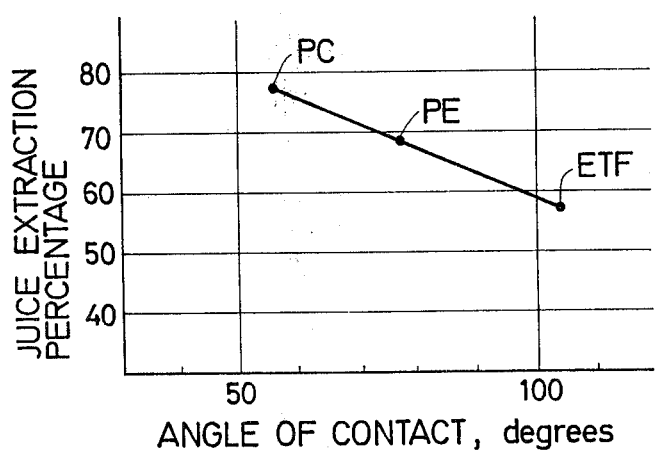
FIG. 18 is a graph showing relationship between the angles of contact of materials to form the filter element and the resultant juice extraction percentage.

The juice extraction percentage is dictated not only by the S/F ratio but by the angle of contact measured in the liquid in contact with the inner and outer surfaces of the filter element. FIG. 18 shows the results of experiments conducted to investigate into the juice extraction percentages achieved in extracting juice from apple by the use of filter elements of polycarbonate (PC), polyethylene (PE) and ethylene tetrafluoride (ETF) in the juice extractor embodying the present invention. As seen in FIG. 18, the experiments reveal that the filter element of polycarbonate (having the angle of contact of 56° provides the extraction percentage of approximately 77.6%, the filter element of polyethylene (having the angle of contact of 77°) provides the extraction percentage of approximately 68.9% and the filter element of ethylene tetrafluoride (having the angle of contact of 104°) provides the extraction percentage of approximately 56.6%. By plotting the points PC, PE and ETF of the graph shown in FIG. 18, it is understood that the juice extraction percentage is inversely proportional to the angle of contact of the material forming the filter element. In view, moreover, of the fact that it is generally desired of juice extractors to be capable of providing extraction percentages higher than 75 percent, the plot PC-PE-ETF of FIG. 18 further teaches that it is preferable to have the filter element formed of a material, such as polycarbonate, having an angle of contact less than 60°. The increased juice extraction percentage achieved by the use of such a filter may be accounted for by the fact that (1) the juice well "fits" the surface of the filter element of the material having a small angle of contact and is thus easy to pass through the pores in the element so that the amount of liquid contact to finally remain in the refuse is reduced and that (2) the liquid is spread in the form of a thin film on the surface providing a small angle of contact the resistance exerted on the liquid passing through the previously mentioned cylindrical interstice between the filter element and the centrifuge basket is lessened.

From the foregoing description it will have been appreciated that the juice extractor according to the present invention offers the following advantages:

a. Substantially pulp-free fruit or vegetable juice can be obtained because the fine lees and dregs contained in the liquid passed through the filter element are removed when the liquid is passed through the secondary filter medium which is formed between the filter element and the centrifuge basket.

b. The refuse sticking to the filter element can be easily removed by rinsing out the element in water in the absence of solid and semisolid entities penetrating through the pores in the filter element.

c. The centrifuge basket operates stably and thus the vibrations and noises produced by the rotation of the basket are remarkably lessened because the semifluid pulp is evenly distributed on the inner peripheral surface of the filter element throughout the operation of the extractor.

d. The centrifuge basket is not seriously contaminated with solid and semisolid substances and can be easily cleaned by washing or wiping only that portion of the basket which has been exposed to the liquid. The centrifuge basket may therefore be arranged as the built-in type.

e. The liquid can be smoothly and rapidly discharged from the centrifuge basket because the thickness of the cylindrical interstice which constitutes the secondary filter medium is maintained uniform throughout its height during operation.

f. The centrifuge basket is easy and economical to manufacture because the basket is formed with only a limited number of pores.

g. The diameters of the pores in the filter element may be enlarged to provide ease of manufacture because the filter element does not lend itself to separating fine lees and dregs from the pulp.

h. The vibrations of the extractor can be reduced without sacrificing the juice extraction percentage if the total void areas of the filter element and the centrifuge basket are appropriately selected.

i. The juice extraction percentage can be significantly increased if the filter element of a material having an angle of contact less than a predetermined value is used in the extractor.

What is claimed is:

1. A centrifugal separator comprising, a driven hollow rotor having a cylindrical wall portion having a center axis and a smooth inner peripheral surface closed over at least the majority of its total area, means mounting the rotor for rotation about said center axis, and a porous, continuous-wall tubular elastic film initially elongated and having free longitudinal end portions and cylindrically positioned within said cylindrical wall portion of the rotor with said free longitudinal end portions overlapping each other, said film being free from and unfastened to said rotor and being constructed of a material of sufficient resiliency to enable said film to be urged to uniformly radially expand against the inner peripheral surface of said cylindrical wall portion by the elasticity thereof so that the film has a uniformly increased porosity and has its outer peripheral surface in contact substantially throughout the total area of the surface with the inner peripheral surface of said wall portion when the film is free from a force urging the film radially away from the inner peripheral surface of said wall portion, means and to uniformly radially contract to a uniformly decreased porosity and away from the inner peripheral surface of said cylindrical wall portion when the rotor is being driven to rotate about said center axis in the presence of liquid between said film and the inner peripheral of said cylindrical wall portion.

2. A centrifugal separator according to claim 1, in which said cylindrical wall portion of said rotor has an inside diameter substantially uniform throughout the length of the wall portion.

3. A centrifugal separator according to claim 1, in which said rotor is formed with a row of pores which are spaced apart circumferentially of the rotor.

4. A centrifugal separator according to claim 3, in which said axis is vertical.

5. A centrifugal separator according to claim 4, in which said rotor further has a flange portion projecting radially inwardly from the upper end of said cylindrical wall portion and a bottom wall portion extending radially inwardly from the lower end of said cylindrical wall portion.

6. A centrifugal separator according to claim 5, in which said pores are formed in said flange portion.

7. A centrifugal separator according to claim 6, in which each of said pores is contiguous to the inner peripheral surface of said cylindrical wall portion at its end remotest from the inner circumferential edge of said flange portion.

8. A centrifugal separator according to claim 5, in which said pores are formed in said bottom wall portion.

9. A centrifugal separator according to claim 8, in which each of said pores is located to be contiguous to the inner peripheral surface of said cylindrical wall portion to its end closest to the lower end of said cylindrical wall portion.

10. A centrifugal separator according to claim 5, in which said pores are formed in said cylindrical wall portion of said rotor.

11. A centrifugal separator according to claim 10, in which said pores are located close to the upper end of said cylindrical wall portion.

12. A centrifugal separator according to claim 10, in which said pores are located in a vertically intermediate part of said cylindrical wall portion.

13. A centrifugal separator according to claim 10, in which said pores are located close at the lower end of said cylindrical wall portion.

14. A centrifugal separator according to claim 3, in which the total void area of said rotor is smaller than the total void area of said film.

15. A centrifugal separator according to claim 14, in which the ratio of said total void area of said rotor to said total void area of said film is within the range of between about 0.02:1.00 and about 0.1:10.

16. A centrifugal separator according to claim 1, in which said cylindrical wall portion of said rotor is closed throughout its total area and has one free longitudinal end.

17. A centrifugal separator according to claim 1, in which said film is formed of a material having an angle of contact less than 60°.

18. A centrifugal separator according to claim 17, in which said film is formed of polycarbonate.

19. A juice extractor comprising, a driven centrifugal basket having a cylindrical wall portion having a center axis and a smooth inner peripheral surface closed over at least the majority of its total area, means mounting the centrifugal basket rotatable about said center axis, and a porous, continuous-wall tubular elastic film initially elongated and having free longitudinal end portions and cylindrically positioned within said cylindrical wall portion of the centrifugal basket with said free longitudinal end portions overlapping each other, said film being free from and unfastened to said basket and being constructed of a material of sufficient resiliency to enable said film to be urged to uniformly radially expand against the inner peripheral surface of said cylindrical wall portion by the elasticity thereof so that the film has a uniformly increased porosity and has its outer peripheral surface in contact substantially throughout the total area of the surface with the inner peripheral surface of said wall portion when the film is free from a force urging the film radially away from the inner peripheral surface of said wall portion, and to uniformly radially contract to a uniformly decreased porosity and away from the inner peripheral surface of said cylindrical wall portion when the centrifugal basket is driven to rotate about said center axis in the presence of liquid between said film and the inner peripheral surface of said cylindrical wall portion of the basket.

20. A juice extractor according to claim 19, in which said cylindrical wall portion of said centrifuge basket has an inside diameter which is substantially uniform throughout the length of the wall portion.

21. A juice extractor according to claim 19, in which said centrifuge basket is formed with a row of pores which are spaced apart from each other circumferentially of the basket.

22. A juice extractor according to claim 21, in which said center axis is vertical.

23. A juice extractor according to claim 22, in which said centrifuge basket further has a flange portion projecting radially inwardly from the upper end of said cylindrical wall portion and a bottom wall portion extending radially inwardly from the lower end of said cylindrical wall portion.

24. A juice extractor according to claim 23, in which said pores are formed in said flange portion.

25. A juice extractor according to claim 24, in which each of said pores is located to be contiguous to the inner peripheral surface of said cylindrical wall portion at its end remotest from the inner circumferential edge of said flange portion.

26. A juice extractor according to claim 23, in which said pores are formed in said bottom wall portion.

27. A juice extractor according to claim 26, in which each of said pores is located to be contiguous to the inner peripheral surface of said cylindrical wall portion at its end closest to the lower end of said cylindrical wall portion.

28. A juice extractor according to claim 23, in which said pores are formed in said cylindrical wall portion.

29. A juice extractor according to claim 28, in which said pores are located close to the upper end of said cylindrical wall portion.

30. A juice extractor according to claim 28, in which said pores are located in a vertically intermediate part of said cylindrical wall portion.

31. A juice extractor according to claim 28, in which said pores are located close to the lower end of said cylindrical wall portion.

32. A juice extractor according to claim 21, in which the total void area of said centrifuge basket is smaller than the total void areas of said filter element.

33. A juice extractor according to claim 32, in which the ratio of said total void area of said centrifuge basket to said total void area of said filter element is within the range of between about 0.02 and about 0.1.

34. A juice extractor according to claim 19, in which said cylindrical wall portion of said centrifuge basket is closed throughout its total area and has one free longitudinal end.

35. A juice extractor according to claim 19, in which said filter element is formed of a material having an angle of contact less than 60 degrees.

36. A juice extractor according to claim 35, in which said filter element is formed of polycarbonate.

* * * * *